W. SOUTHERN.
SIGNAL DIRECTOR FOR VEHICLES.
APPLICATION FILED SEPT. 25, 1916.

1,232,115.

Patented July 3, 1917.
2 SHEETS—SHEET 1.

Inventor
Wm Southern

By E. B. Clark

Attorney

W. SOUTHERN.
SIGNAL DIRECTOR FOR VEHICLES.
APPLICATION FILED SEPT. 25, 1916.
1,232,115.
Patented July 3, 1917.
2 SHEETS—SHEET 2.
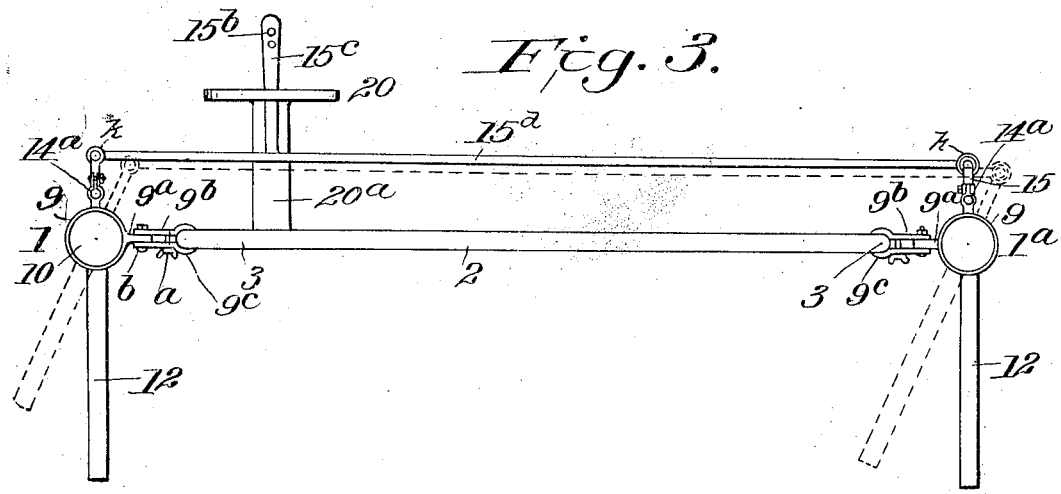
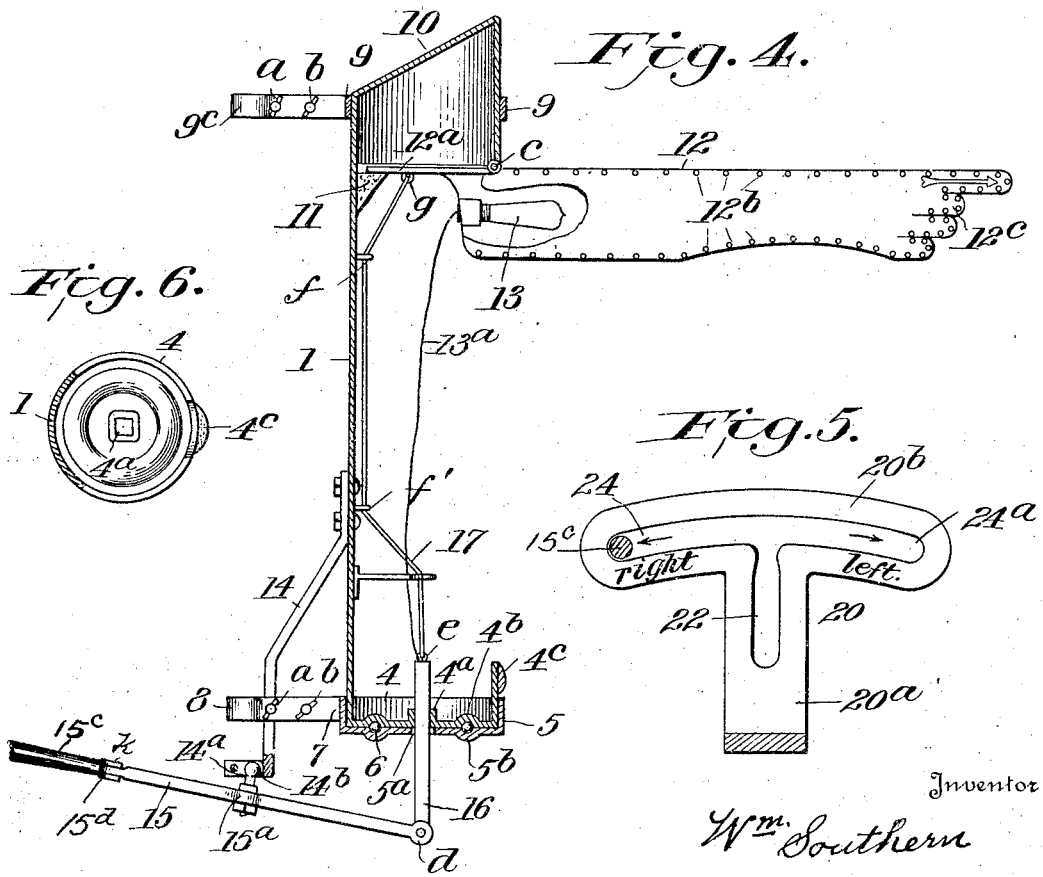

UNITED STATES PATENT OFFICE.

WILLIAM SOUTHERN, OF NANAIMO, BRITISH COLUMBIA, CANADA.

SIGNAL-DIRECTOR FOR VEHICLES.

1,232,115.  Specification of Letters Patent.  Patented July 3, 1917.

Application filed September 25, 1916. Serial No. 122,157.

*To all whom it may concern:*

Be it known that I, WILLIAM SOUTHERN, a subject of the King of Great Britain, residing at Nanaimo, Province of British Columbia, Canada, have invented certain new and useful Improvements in Signal-Directors for Vehicles, of which the following is a specification.

This invention relates to a director signal device for automobiles and other vehicles.

The principal object of my invention is to provide a simple and effective director signal or indicator for automobiles and other vehicles, for quickly showing to the traffic regulating officer and to a rear car the direction in which the car is to turn or to go forward, so as to avoid collision, accident or confusion, and thus make operation of the car quicker and safer.

A more specific object is to provide a director hand or arm and means for quickly raising it and turning a standard carrying the arm so that it will project to one side of the car, as a directing signal to the pedestrian, traffic officer and the car behind, for promoting quicker action and greater safety.

Another object is to provide for conveniently applying one or more signal director devices to the wind shield or other part of a car, and operating devices therefor in front of the operator, so that it will not be necessary for him to extend his arm out to the right or reach over to the left hand side of the car to signal with his hand.

The matter constituting my invention will be defined in the claims.

I will now describe my invention in detail by reference to the accompanying drawings, in which—

Fig. 3 represents a top plan view of my director signal device in duplicate connected to a wind-shield, the front of the shield being at the bottom of the figure.

Fig. 4 represents a sectional elevation, on enlarged scale, of the director signal.

Fig. 5 represents a sectional elevation, on enlarged scale, of the lever control switch board.

Fig. 6 represents a top plan view of the base cup of a director standard with the latter in horizontal section.

I preferably construct my director signal with duplicate standards and director arms, that is, a standard and arm attached to each outer edge of a wind-shield frame, on opposite sides of an automobile or other vehicle. Though I have shown the device attached to a wind-shield frame it may be secured to other supports at the front of a vehicle, as a carriage, wagon or car.

Figure 2:
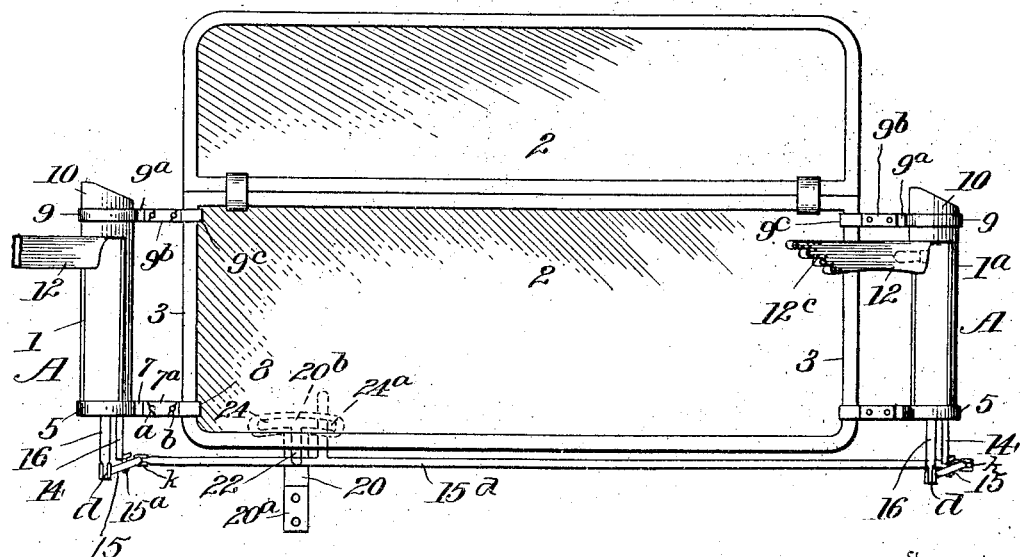
Fig. 2 represents a rear elevation or inside view of a wind-shield showing my invention in place.

The directors A are shown in the preferred positions in Figs. 2 and 3 attached to the wind-shield. In constructing the directors I provide for each a standard 1, 1ᵃ and as each is a duplicate of the other I will describe one of them, as shown more fully in Fig. 4. Each is attached to the frame 3 of a wind-shield 2. The standard 1 has secured to it a circular base cup 4 adapted to turn on ball bearings in a holder cup 5. The cup 4 has a central angular opening or sleeve 4ᵃ, and an annular bottom groove 4ᵇ, also a rubber or other flexible buffer 4ᶜ to protect the finger of the indicator arm 12 from injury. The holder cup 5 has a central round opening 5ᵃ and an annular groove 5ᵇ for the balls 6. The cups 4 and 5 are made of dimensions for permitting cup 4 to turn freely in cup 5. To cup 5 is rigidly secured a supporting bar 7, having an extension arm 7ᵃ which is provided with a spring clamp 8 to engage with the frame 3 of a wind shield 2 or other supporting rod or post. The extension arm 7ᵃ can be slid outward or turned to one side in the forked or slotted bar 7 and is secured therein by a thumb-nut *b*. The clamp 8 is provided with a thumb-nut *a*. Other well known kinds of fastening devices may be used.

To the top of the standard is secured a hollow cap or bracket 10, of substantially the same diameter as the base cup 4, and this cap is arranged to turn loosely and freely in a holder ring 9, which is provided with a rigidly connected supporting bar or shank 9ᵃ. This bar is preferably slotted for connection of a forked extension arm 9ᵇ, which is provided with a spring clamp 9ᶜ, Figs. 3 and 4. The arm 9ᵇ is secured to the bar 9ᵃ by a thumb screw *b* and is provided with a thumb screw *a* for tightening the clamp 9ᶜ on frame 3. To the standard below cap 10 is secured a buffer or stop device 11. A swinging hollow director arm 12 is hinged at *c* to the outer edge of cap 10 and is made of light material, such as aluminum or other thin metal, and is provided with a rear extension member 12ª adapted to rest on the buffer 11 when the arm is in raised position shown in Fig. 4. The director arm is preferably provided with lines of holes 12¹ near the edges and with an indicator hand 12° and stenciled arrow. An electric light 18 is fixed in a socket at the enner end of the arm, and to the socket is attached an electric conductor cord 13ª which passes down into a hollow lever 15 to a push button 15ᵇ in the handle. In case the lever is not hollow the cord will pass through eyes or loops along the length of the lever.

A bent hanger bar 14 is secured to the standard and terminates in a foot piece 14ª having a socket bearing 14ᵇ. An operating lever 15, having a fulcrum bearing 15ª, is pivotally connected at joint $d$ to an angular stud or post 16, which works vertically through the angular sleeve 4ª of cup 4. The fulcrum bearing 15ª forms a swivel joint with the socket 14ᵇ, so that the handle of the lever may be freely turned to the right or left and work at any angle. Each of the signal director devices has a short operating lever 15, Figs. 2 and 3, connecting by a pivot joint $k$ with the connecting rod 15ᵈ and the latter has a handle 15ᶜ, Figs. 1 and 3, adapted to work in the slots 22 and 24—24ª of the lever control device 20, Figs. 2 and 5. To the upper end of the post 16 is secured an eye $e$, and to the standard 1 are secured guide eyes $f, f'$. A light wire or chain 17 is attached to the eye $e$ and passed through the eyes $f, f'$ and attached to an eye $g$ in the member 12ª of the director arm.

Figure 1:
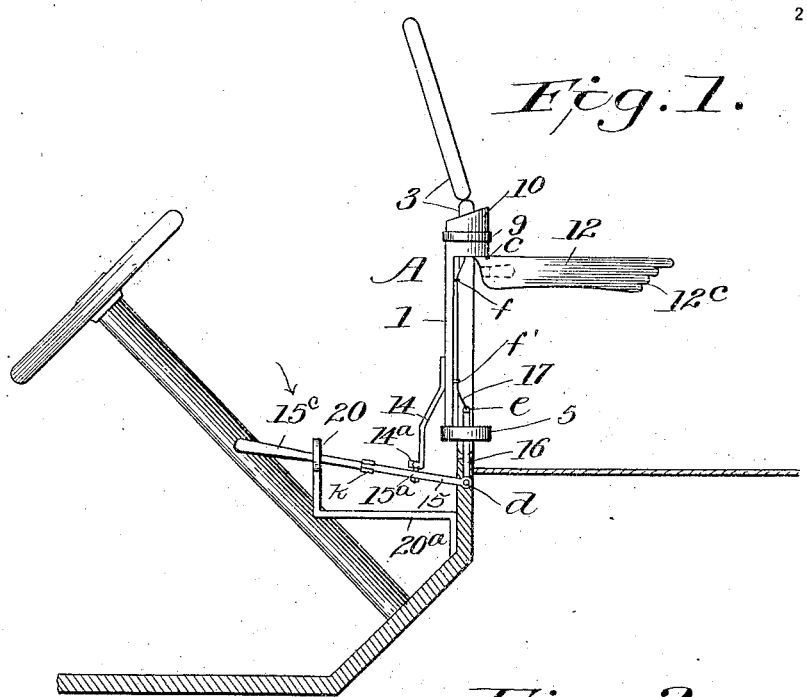
Figure 1 represents a side elevation of part of an automobile showing my director signal device applied to the wind-shield.

The lever control switchboard 20, Fig. 5, is secured by its central shank or stem 20ª to the front part of the machine near the steering post and wheel, as shown in Figs. 1 and 2. This switch board is made with an upper arc-shaped member 20ᵇ.

The stem 20ª and member 20ᵇ are provided respectively with a slot 22 and 24—24ª, the latter being curved as shown. These slots serve for guiding the movement of the handle 15ᶜ of the operating lever 15ᵈ.

If the lever handle 15ᶜ is placed up in the central slot 22 the director arms will point directly ahead as indicated in Fig. 1. If the handle 15ᶜ is moved in slot 21 to the place marked "right," in Fig. 5, the director arms will be turned to the left when the vehicle is to be turned to the left. In case the vehicle is to be turned to the right the handle 15ᶜ will be moved in slot 24ª to the place marked "left" on the switch board. The operation is very simple and can be effected by the chauffeur quickly and while one hand remains on the steering wheel. In the night time the operator has only to press the push-button 15ᵇ in the handle to light the lamps in the director arms.

My signal director device has the advantage of easy and quick application to the frame of a wind-shield or to rods or uprights on any vehicle and may be quickly put into operation.

I make no claim in this application to an electric light and electric connections therefor.

Having described by invention, what I claim, and desire to secure by Letters Patent, is—

1. In a signal director device for vehicles, a holder base bearing provided with an opening, a standard having a base provided with an angular opening and mounted to turn on the holder base, a vertically movable stud passing through the openings and engaging with the base of the standard for turning the same, a hinged pointing arm on the standard and means for raising the arm.

2. In a signal director device for vehicles, a revoluble standard having an upper bracket support, a pointing or indicating arm hinged to the bracket and having a part projecting back of the hinge, an operating lever and a connection therefrom to the rear projection for raising the arm into the indicating position.

3. In a signal director device for vehicles, a holder base having ball bearings, a director standard having a base fitting in the holder to turn therein, an indicator arm hinged to the top of the standard, a flexible connection attached to the arm for raising it and means for turning the director standard.

4. In a signal director device for vehicles, a director standard having a base mounted to turn on bearings and having an angular opening, an angular stud working said opening to turn the standard, a pointer arm hinged near the upper end of the standard and having a rearward projection, a flexible connection between the projection and said stud and means connecting with the stud for pulling it downward and for turning the standard, so that the arm may be raised and turned with the standard.

5. In a signal director device for vehicles, the combination with a holder bearing having a bottom opening, of a director standard having a base in said holder and also having a supporting hanger, a lever loosely connecting with said hanger and having pivoted to its outer end a stud engaging with said base, a bracket at the upper end of the standard, an indicating arm hinged to the bracket and a flexible connection from the rear end of the arm to said stud, whereby the standard may be turned and its arm raised.

6. In a signal director device for vehicles, a revoluble director standard having a base mounted to turn on bearings and having an opening, a vertically movable stud in the opening adapted to engage with the base to turn the same, a pointer-arm hinged near the upper end of the standard, a flexible connection between the rear end of the arm and said movable stud and means connecting with the stud for pulling it downward, so that the arm may be raised.

7. In a signal director device for vehicles, the combination with a revoluble standard mounted to turn at its lower end on bearings and having a pointing arm at its upper end, a downwardly projecting stud connecting with the lower end of the standard, a hanger secured to the standard, a lever connecting by a swivel joint with the hanger and said stud, a rod, having a handle, connecting with said lever, and a lever control device having slots engaging said handle to permit it to be moved therein to control the turning movement of the standard.

8. In a signal director device for vehicles, the combination with a revoluble standard carrying a swinging pointing arm, of a vertically movable stud engaging with the base of the standard, a flexible connection between the arm and stud, a hanger on the standard, an operating lever having a fulcrum connection with the hanger and pivotally connecting with the lower end of said stud, a rod, having a handle, connecting with the lever, and a lever control device having a vertical and right and left slots with which said handle engages, whereby the arm may be raised and the standard turned and set in the desired position.

In testimony whereof I affix my signature in presence of two witnesses.

WILLIAM SOUTHERN.

Witnesses:
ROBERT HOWARD ORMOND,
JOHN BARSBY.